July 25, 1967 — L. J. O'DELL — 3,332,218
DUST COLLECTOR APPARATUS
Filed Feb. 27, 1964 — 2 Sheets-Sheet 1
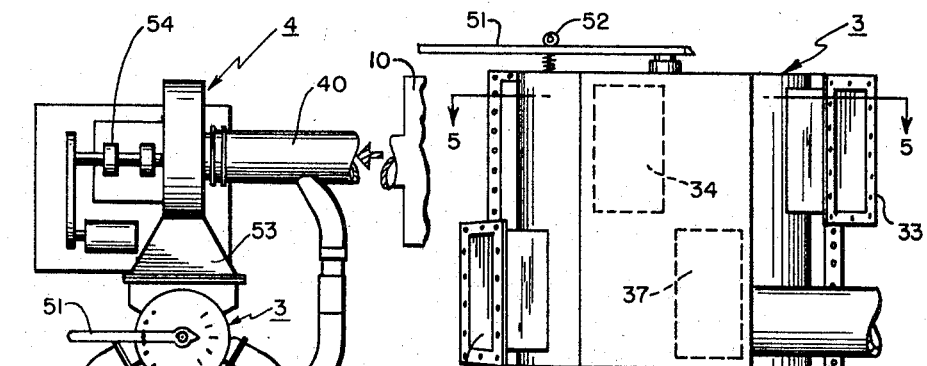
FIG. 1 — FIG. 3
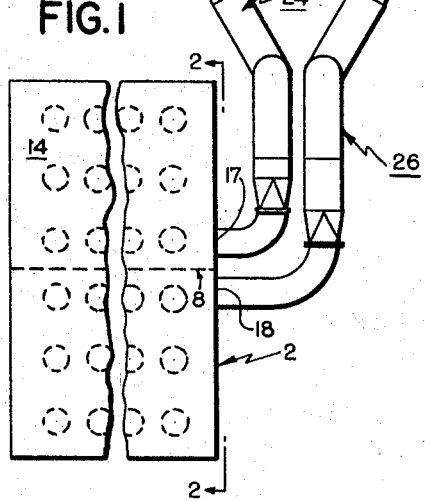
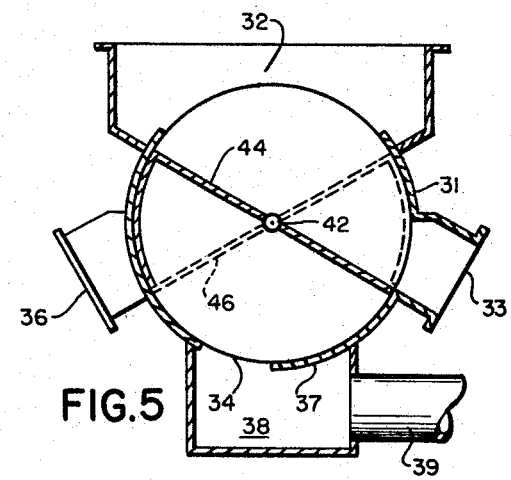
FIG. 5
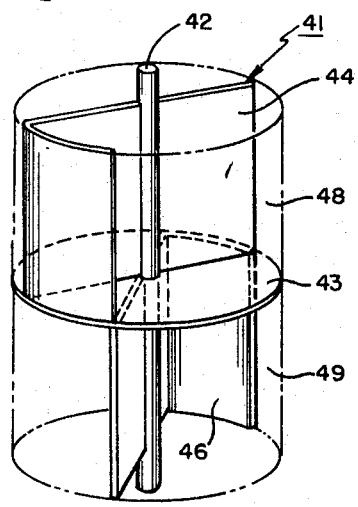
FIG. 4
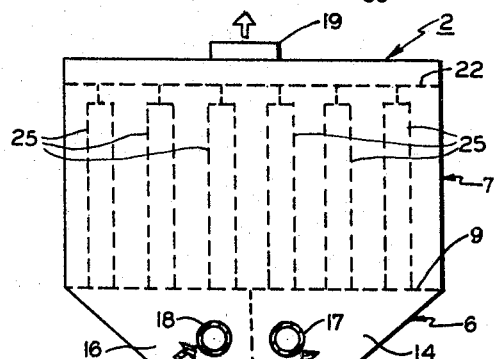
FIG. 2
INVENTOR.
LEONARD J. O'DELL
BY
Ralph E. Brick
ATTORNEY

United States Patent Office 3,332,218
Patented July 25, 1967

3,332,218
DUST COLLECTOR APPARATUS
Leonard J. O'Dell, Louisville, Ky., assignor to American Air Filter Company, Inc., Louisville, Ky., a corporation of Delaware
Filed Feb. 27, 1964, Ser. No. 347,814
6 Claims. (Cl. 55—303)

This invention relates to apparatus for collecting contaminant particles from a dirty gas stream and more particularly to an improved gas pervious fabric type dust collector arrangement for collecting contaminant particles from a dirty gas stream passed therethrough.

Gas pervious fabric type dust collectors have been used for many years in the removal of various industrial air pollutant materials. Dirty gas streams eminating from such sources as metal melting cupolas and open hearth furnaces have been passed through gas pervious fabric tube-type collectors in order to remove contaminant particles therefrom, the contaminant particles collecting in cake form on the internal surfaces of the tubes. To periodically remove the collected cake of contaminant particles from the tube in order to maintain appropriate gas cleaning efficiencies, the tubes have been either physically shaken with mechanical shaker apparatus connected directly thereto or have been collapsed and reinflated to break and dislodge the contaminant cake. More recently, the latter approach of collapsing and reinflating fabric tubes has been favored and a number of arrangements for accomplishing such collapsing and reinflation of the tubes have become well known in the art. For the most part, these arrangements have proven to be complex and expensive, quite often requiring extensive damper systems and frequently depending upon complicated electrical and/or electronic circuits. Furthermore, frequent periodic shutdowns of operation are required in some arrangements to accomplish effective cleaning.

In accordance with the present invention, an efficient and economical to maintain and operate fabric tube-type dust collector arrangement is provided which avoids the above-mentioned disadvantages of the past, the arrangement of the present invention lending itself to simple, straight-forward manual actuation in situations where only limited power sources are available. In addition, the arrangement of the present invention permits selective tube cleaning at an operator's discretion, eliminating previously required complex and costly actuating mechanisms and avoiding previously required complex damper mechanisms in the tube or "bag" housings.

Various other features of the present invention will become obvious to one skilled in the art upon reading the disclosure set forth herein.

More particularly, the present invention provides apparatus for collecting contaminant particles from a dirty gas stream source comprising: at least two collector sections positioned downstream the ditry gas stream source, the collector sections including dirty gas inlets and a clean gas outlet with gas pervious fabric collector members positioned therebetween; blower means to move a dirty gas stream through the collector sections; and, valve means positioned upstream the collector sections, the valve means including a casing having dirty gas inlet port means to receive dirty gas from the dirty gas stream source, spaced dirty gas outlet ports connected to the dirty gas inlets of the collector sections, and spaced reverse cleaning ports connected upstream the blower means, the valve means further including valve gate members rotatably disposed within the casing to selectively open and close the ports whereby a dirty gas stream can be delivered simultaneously to the sections and whereby at least one collector section can be treating the dirty gas stream while another collector section passes through a reverse cleaning cycle.

It is to be understood that various changes can be made by one skilled in the art in the arrangement, form and construction of the apparatus disclosed herein without departing from the scope or spirit of the present invention.

Referring to the drawings, which disclose one advantageous embodiment of the present invention:

FIGURE 1 is a schematic plan view of the inventive assembly;

FIGURE 2 is a front elevational view of the collector housing taken in a plane passing through line 2—2 of FIGURE 1;

FIGURE 3 is an enlarged front elevational view of the valve casing disclosed in the assembly of FIGURE 1;

FIGURE 4 is an enlarged perspective view disclosing details of the valve rotor and valve gates mounted in the valve casing of FIGURE 3;

FIGURE 5 is a horizontal cross-sectional view taken in a plane passing through line 5—5 of FIGURE 3 disclosing the valve gates in a position wherein the collector sections are in operative condition for gas cleaning;

Figure 6:
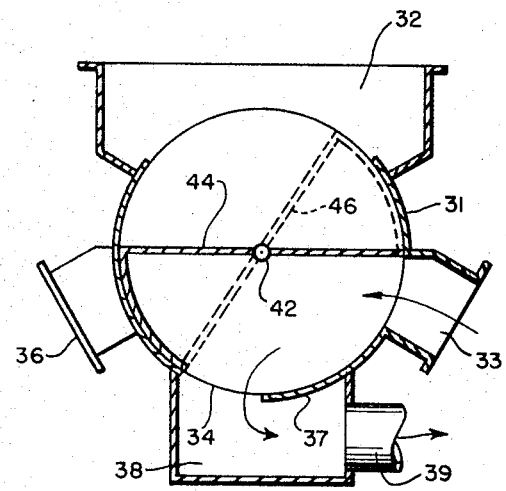
Figure 7:
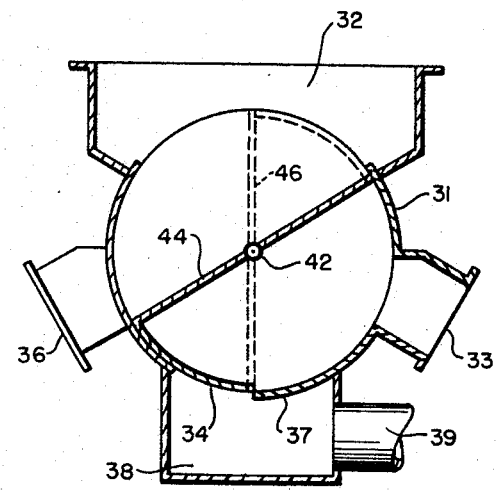
Figure 8:
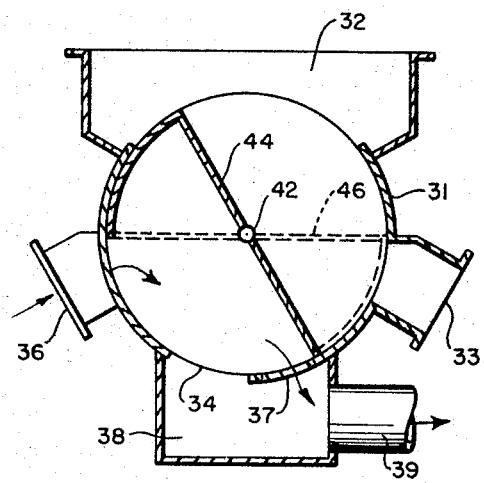
Figure 9:
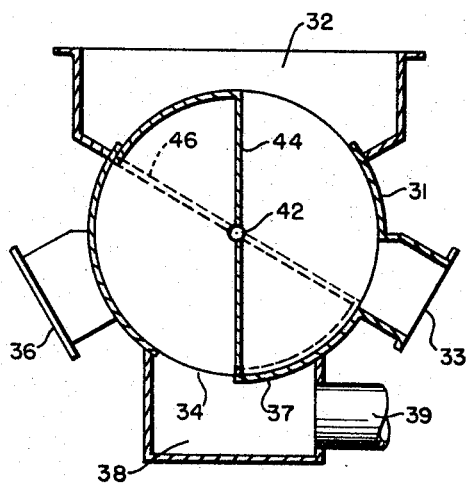

FIGURE 6 is a horizontal cross-sectional view like that of FIGURE 5 disclosing the valve gates in a position wherein the collector section associated with the upper set of spaced and annularly aligned ports in the valve casing is in condition for reverse cleaning and the collector section associated with the lower set of spaced and annular aligned ports in the valve casing is in condition for gas cleaning;

FIGURE 7 is a horizontal cross-sectional view like that of FIGURE 5 disclosing the valve gates in a position wherein the collector section associated with the upper set of spaced and annularly aligned ports in the valve casing is in a "null" condition and the collector section associated with the lower set of spaced and annularly aligned ports in the valve casing is in condition for gas cleaning;

FIGURE 8 is a horizontal cross-sectional view like that of FIGURE 5 disclosing the valve gates in a position wherein the collector section associated with the upper set of spaced and annularly aligned ports in the valve casing is in condition for gas cleaning and the collector section associated with the lower set of spaced and annularly aligned ports in the valve casing is in condition for reverse cleaning; and, FIGURE 9 is a horizontal cross-sectional view like that of FIGURE 5 disclosing the valve gates in a position wherein the collector section associated with the upper set of spaced and annularly aligned ports in the valve casing is in condition for gas cleaning and the collector section associated with the lower set of spaced and annularly aligned ports in the valve casing is in a "null" condition.

Referring to FIGURE 1 of the drawings, it can be seen that the inventive assembly broadly includes collector housing 2, selector valve 3 upstream thereof, and blower 4 upstream the selector valve.

Collector housing 2, as disclosed in FIGURES 1 and 2 of the drawings, includes dirty gas inlet and hopper compartment 6 and tube compartment 7, compartment 6 being separated from compartment 7 by apertured header plate 9 extending in horizontal fashion across the lower portion of housing 2. Dirty gas inlet and hopper compartment 6 is divided into two dirty gas plenum and hopper sections 14 and 16 by gas impervious, vertically extending partition plate 8 which extends from the bottom of compartment 6 to abut against the lower face of header plate 9 intermediate the ends of the plate. The dirty gas plenums 14 and 16 are provided with dirty gas inlets 17 and 18, respectively. Dirty gas plenum section 14 is arranged to communicate with one section of a plurality of vertically extending porous fabric tube collectors 25 (hereinafter described) suspended in tube compartment 7 and dirty gas plenum section 16 is arranged to communicate with another section of such tubes 25 in tube compartment 7. The tube sections in tube compartment 7, as disclosed, are in communication with each other, but if desired a partition also can be provided between these sections.

Tube compartment 7 is provided with clean gas outlet 19 at the top portion thereof, this outlet serving either or both of the tube sections aforedescribed during gas cleaning operations. It is to be understood that if the tube compartment were partitioned, than separate gas outlets would be required for each tube section. Extending in a horizontal fashion across the upper portion of tube compartment 7 is grating 22. Suspended therefrom in vertical fashion to communicate with the apertures in header plate 9 are gas pervious fabric type tube collectors 25. Tubes 25, which can be manufactured from any one of a number of suitable gas pervious fabric materials and which advantageously are made from fibrous glass material capable of resisting temperatures as high as 550° F., are closed at their upper ends. It is to be understood that any one of a number of suitable fastening arrangement can be provided to suspend tubes 25 between grating 22 and the apertures of header plate 9. For example, if desired, the upper portion of tubes 25 can be capped so that the tubes can then be suspended from the grating by chain members connected to the caps. The lower portions of each of the tubes can fit over thimbles or sleeves (not shown) surrounding each of the apertures in the header plate 9 and then suitable draw-band clamps utilized to fasten the tubes to the thimbles (also not shown). It further is to be understood that the present invention is not to be considered as limited to the specific "upflow" system described. If desired, a suitable "downflow" system also can be utilized.

To connect the dirty gas plenums 14 and 16 and the tube sections associated therewith to selector valve 3, suitable duct and transition assemblies 24 and 26, respectively, are provided. As can be seen in FIGURES 3 and 5, selector valve 3 includes cylindrical valve casing 31 having an upper and lower set of spaced and annularly aligned ports. The upper set of spaced and annularly aligned ports associated with dirty gas plenum 16 through duct assembly 26 includes dirty gas inlet port 32, dirty gas outlet port 33 and reverse gas port 34. The lower set of spaced and annularly aligned ports associated with dirty gas plenum 16 through duct assembly 24 includes dirty gas inlet port 32 (which also serves as the dirty gas inlet port for the upper set of ports), dirty gas outlet port 36 and reverse gas port 37. It is to be noted that dirty gas outlet port 36 connects with duct and transition assembly 24 and dirty gas outlet port 33 connects with duct and transition assembly 26. It further is to be noted that the reverse outlet ports 34 and 37 of the upper and lower sets of spaced and annularly aligned ports, respectively, communicate with reverse gas plenum 38. Plenum 38, in turn, is connected by duct and transition assembly 39 to main stream duct 40 leading from a dirty gas source 10, shown schematically in FIGURE 1, to blower assembly 4. The connection of duct 39 with main stream gas duct 40 is accomplished upstream blower 4. Accordingly, as well be seen more fully hereinafter, when the proper ports of selector valve 3 are open, blower 4 serves to draw a gas stream in a reverse, tube collapsing manner from one of the tube sections of collector housing 2, through one compartment of selector valve 3, reverse plenum 38, ducts 39 and 40, blower 4, and back through another compartment of selector valve 3 to the other tube section of collector housing 2.

To accomplish the selective opening and closing of the sets of annularly aligned and spaced ports in cylindrical valve casing 31, rotor member 41 (FIGURE 4) is provided. Rotor member 41 includes centrally disposed rotor stem 42, disc-like partition 43 fastened normally to stem 42 intermediate the ends thereof, and a pair of L-shaped valve gates 44 and 46 fastened to and projecting from either side of disc-like partition 43. Gates 44 and 46 are positioned in angularly offset relation with respect to each other on the disc-like partition 43 and are so arranged that one leg of each gate extends diametrically across the partition 43 and the other leg extends along the periphery of the partition 43. It is to be understood that the peripherally extending leg portions of valve gates 44 and 46 are selectively spaced, sized and proportioned in relationship to the spacing, size and proportion of the sets of spaced and annular ports in valve casing 31 with which they cooperate in order to obtain the hereinafter described results. It further is to be understood that these relative sizes, spacings, and proportions can be varied by one skilled in the art in accordance with the situation in which a particular selector valve is to be used.

As can be seen in FIGURES 4–9 of the drawings, rotor 41 is sized to fit snugly but rotatably in valve casing 31 with partition 43 serving to divide the cylindrical casing into two compartments 48 and 49 (FIGURE 4). Compartment 48 communicates with the upper set of spaced and annularly aligned ports 32, 33 and 34. Compartment 49 communicates with the lower set of spaced and annularly aligned ports 32, 36 and 37. The ends of rotor stem 42 are rotatably supported in suitable bearing blocks (not shown) and fastened to the upper end of rotor stem 42 is manually operable handle 51. It is to be understood that the present invention is not limited to the manually operable structure disclosed, but that, if desired, a suitable motor also can be attached to rotate stem 42. In the embodiment disclosed (FIGURES 1 and 3), handle 51 is provided with spring loaded detent 52. This detent serves to engage in preselected holes in the top of valve casing 31 to hold rotor 41 in any one of several possible operation positions.

As can be seen in FIGURE 1 of the drawing, valve casing 31 is connected adjacent its inlet port 32 to a suitable transition assembly 53 which, in turn, connects to blower 4. Blower 4 (not shown in detail) can be selected from any one of a number of suitable centrifugal blowers known in the art and, as broadly disclosed, is operated through a suitable motor and drive assembly 54.

Referring to FIGURES 5–9 of the drawings, the valve gates 44 and 46 of selector valve 3 are disclosed in a series of various positions to obtain a variety of operating conditions. In FIGURE 5, rotor 41 and valve gates 44 and 46 are so set that dirty gas outlet port 33 in the upper set of annularly spaced ports and dirty gas outlet port 36 in the lower set of annularly spaced ports are open and in communication with dirty gas inlet port 32. As a result, dirty gas enters into valve casing 31 through dirty gas inlet 32, passes into both compartments 48, 49 of the casing, flows out dirty gas outlets 33 and 36, respectively, through ducts 26 and 24, respectively, and into plenums 16 and 14, respectively, where the dirty gas is treated by passing through filter tubes 25 of the tube sections, and then passes out the clean gas outlet 19.

In FIGURE 6, rotor 41 and valve gates 44 and 46 are so set that the upper dirty gas outlet port 33 is cut off from dirty gas inlet 32; however, it is not cut off from reverse gas port 34. As a result, blower 40 causes a reverse flow from dirty gas plenum 16 and the tube section associated therewith, through duct 26, port 33, port 34, into reverse chamber 38, through duct 39, through blower 4 and back into valve casing 31 with the gas stream passing through dirty gas inlet port 32, open dirty gas outlet port 36 of the lower set of ports, duct 24 connected thereto and into dirty gas plenum 14 and the tube section associated therewith.

In FIGURE 7, the valve gate 46 for the lower ports is so set that dirty gas still passes through duct 32 and out dirty gas outlet 36 into chamber 14 through duct 24. On the other hand, the valve gate 44 for the upper set of ports is so set that reverse port 34 is shut off as is gas outlet port 33 cut off from dirty gas inlet port 32. As a result, there is a "null" period of operation with respect to dirty gas plenum 16 and the tube section associated with the upper set of ports.

In FIGURE 8 a situation reverse to that of FIGURE 6 is disclosed. That is, the valve gates 44 and 46 are so positioned that dirty gas flows through dirty gas inlet port 32, through open port 33 of the upper compartment through duct 26 and into dirty gas plenum 16 and the tube section associated therewith. On the other hand, dirty gas cannot flow from dirty gas inlet port 32 and out through dirty gas outlet port 36 of the lower compartment. Rather, dirty gas outlet port 36 and reverse gas port 37 communicate with each other so that reverse flow is created in dirty gas plenum 14 and the tube section associated therewith, the gas flowing from plenum 14 through duct 24, through port 36, port 37, into reverse plenum 38, through duct 39, blower 4 into dirty gas inlet 32, and out through dirty gas outlet port 33 into plenum 16 and the tube section associated therewith.

In FIGURE 9, a situation reverse to that of FIGURE 7 is obtained. That is, valve gates 44 and 46 are so set that dirty gas continues to flow through ports 32 and 33 of the upper set of ports, through duct 26 into collector compartment 16. On the other hand, lower port 36 is cut off from dirty gas inlet port 32 and in like manner is cut off from reverse gas port 37. As a result a "null" condition is created in plenum 14. It is to be understood that, as a result of this "null" condition as taught in both FIGURES 7 and 9, the tubes in the respective sections are allowed to discharge the accumulated dust cake which has been broken and dislodged by the reverse cleaning operation in a manner similar to that set forth in the inventor's U.S. application Ser. No. 141,073, filed Sept. 27, 1961, now U.S. Patent No. 3,217,468.

From the aforedescribed, it can be readily seen that a straight-forward, economical and efficient arrangement is provided to collapse, reinflate, and "null" fabric tubes of a dust collector arrangement without shut-down and without requiring complex electrical or electronic equipment or complicated physical shaking mechanisms. It is to be understood that, although only a two section collector housing and selector valve arrangement is disclosed herein, the present invention can be incorporated in collector housing and selector valve arrangement including more than two sections.

The invention claimed is:
1. Apparatus for collecting contaminant particles from a dirty gas stream source comprising:
  (a) at least two collector sections positioned downstream said dirty gas stream source, said collector sections including dirty gas inlets and a clean gas outlet with gas pervious filter fabric collector members positioned therebetween;
  (b) duct means connecting said dirty gas stream source to said dirty gas inlets of said collector sections;
  (c) single blower means disposed in said duct means to move a dirty gas stream through said collector sections; and,
  (d) single valve means disposed in said duct means upstream said collector sections, said valve means including a casing having disposed in the peripheral wall thereof dirty gas inlet port means communicably connected on one side of said blower means to receive dirty gas from said dirty gas stream source, said casing also having disposed in the peripheral wall thereof spaced dirty gas outlet ports connected to each of the dirty gas inlets of said collector sections to deliver dirty gas to said sections, and casing further having disposed in the peripheral wall thereof spaced reverse cleaning ports communicably connected on the other side of said blower means;
  (e) said valve means further including valve actuating means and a single rotor and valve gate member connected thereto so as to be rotatably disposed within said casing to selectively open and close said dirty gas inlet ports, dirty gas outlet ports, and reverse cleaning ports whereby a dirty gas stream can be delivered simultaneously to said sections and whereby at least one collector section can be treating said dirty gas stream while another collector section passes through a reverse cleaning cycle.

2. Apparatus for collecting contaminant particles from a dirty gas stream source comprising:
  (a) at least two collector sections positioned downstream said dirty gas stream source, said collector sections including dirty gas inlets and a clean gas outlet with gas pervious filter fabric collector members positioned therebetween;
  (b) duct means connecting said dirty gas stream source to said dirty gas outlets of said collector section;
  (c) single blower means to move a dirty gas stream through said collector sections; and,
  (d) single valve means disposed in said duct means upstream said collector sections, said valve means including a single cylindrical type casing having disposed in the peripheral wall thereof two sets of spaced ports, each set being annularly aligned and including a dirty gas inlet port communicably connected to the downstream side of said blower means to receive dirty gas from said dirty gas stream source, a dirty gas outlet port connected to a dirty gas inlet of a collector section to deliver dirty gas to said section, and a reverse cleaning port communicably connected to the upstream side of said blower means;
  (e) said valve means further including valve actuating means and a single rotor member connected thereto to be rotatably disposed within said casing, said rotor member comprising a rotor stem having a partition disc mounted thereon and extending therefrom to divide said valve casing into two separate compartments each communicating with one of said sets of spaced and annularly aligned ports, and gate means on said rotor member to selectively open and close said ports whereby a dirty gas stream can be delivered simultaneously to said collector sections and whereby at least one collector section can be treating said dirty gas stream while another collector section passes through a reverse cleaning cycle.

3. The apparatus of claim 2,
  (a) said gate means comprising angularly offset L-shaped partition members mounted to and projecting from either side of said partition disc with one leg extending thereacross and the other along the disc periphery.

4. Apparatus for collecting contaminant particles from a dirty gas stream source comprising:
  (a) at least two collector sections positioned downstream said dirty gas stream source, said collector sections including dirty gas inlets and a clean gas outlet with gas pervious filter fabric collector members mounted therebetween;
  (b) duct means connecting said dirty gas stream source to said dirty gas inlets of said collector sections;
  (c) single blower means disposed in said duct means and connected to said dirty gas stream source to move a dirty gas stream through said collector sections;
  (d) and single valve means disposed in said duct means intermediate said collector sections and said blower means, said valve means including a casing having disposed in the peripheral wall thereof a dirty gas inlet port connected to said downstream thereof blower means, a pair of spaced dirty gas outlet ports connected to each of the dirty gas inlets of said collector sections to deliver dirty gas to said section, and a pair of spaced reverse cleaning ports communicably connected to the upstream side of said blower means;

(e) said valve means further including valve actuating means and a valve gate member connected thereto so as to be rotatably disposed within said casing to selectively open and close said dirty gas inlet ports, dirty gas outlet ports, and said reverse cleaning ports whereby a dirty gas stream can be delivered simultaneously to said sections and whereby at least one collector section can be treating said dirty gas stream while another collector section passes through a reverse cleaning cycle.

5. Apparatus for collecting contaminant particles from a dirty gas stream source comprising:

(a) a collector housing positioned downstream said dirty gas stream source;

(b) a partition in said housing dividing said housing into at least two separately operable collector sections, each having a dirty gas inlet and a clean gas outlet with a plurality of gas pervious filter fabric tube collectors positioned therebetween;

(c) duct means connecting said dirty gas stream source to said dirty gas inlets of said collector sections;

(d) single blower means disposed in said duct means and connected to said dirty gas stream source to move a dirty gas stream through said fabric tube collector sections;

(e) and single valve means disposed in said duct means intermediate said collector housing and said blower means, said valve means including a cylindrical type casing having disposed in the peripheral wall thereof two sets of spaced ports, each set being annularly alinged and including a dirty gas inlet port communicably connected on one side of said blower means to receive dirty gas from said dirty gas stream source, a dirty gas outlet port connected to a dirty gas inlet of a collector section to deliver dirty gas to said section, and a reverse cleaning port communicably connected to the other side of said blower means;

(f) said valve means further including valve actuating means and a rotor member connected thereto to be rotatably disposed within said casing, said rotor member comprising a manually powered rotor stem having a partition disc mounted thereon and extending therefrom to divide said casing into two separate compartments, each communicating with one of said sets of spaced and annularly aligned ports, and angularly offset L-shaped valve gates mounted to and projecting from either side of said partition disc with one leg extending diametrically thereacross and the other along the disc periphery to selectively open and close said ports whereby a dirty gas stream can be delivered simultaneously to said collector sections and whereby at least one collector section can be treating said dirty gas stream while another passes through a reverse cleaning cycle.

6. The apparatus of claim 5, (a) said casing including a reverse gas plenum with which said reverse cleaning ports of each of said port sets communicate, said reverse gas plenum being connected by a duct member to said blower means.

References Cited

UNITED STATES PATENTS

| | | | |
|---|---|---|---|
| 1,100,091 | 6/1914 | Pennington | 137—625.46 |
| 1,538,292 | 5/1925 | Lindsay | 55—303 |
| 2,332,882 | 10/1943 | Abbatiello | 137—625.47 |
| 2,836,256 | 5/1958 | Caskey | 55—293 |
| 3,220,164 | 11/1965 | Golay | 55—67 |

FOREIGN PATENTS

| | | |
|---|---|---|
| 122,982 | 8/1901 | Germany. |
| 533,756 | 9/1931 | Germany. |
| 903,890 | 2/1954 | Germany. |

HARRY B. THORNTON, *Primary Examiner.*

B. NOZICK, *Assistant Examiner.*